US012644509B2

(12) United States Patent
Dötschel

(10) Patent No.: US 12,644,509 B2
(45) Date of Patent: Jun. 2, 2026

(54) DIFFERENTIAL TRANSMISSION FOR A VEHICLE

(71) Applicant: ZF Friedrichshafen AG, Friedrichshafen (DE)

(72) Inventor: Philip Dötschel, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 25 days.

(21) Appl. No.: 18/965,032

(22) Filed: Dec. 2, 2024

(65) Prior Publication Data

US 2025/0180103 A1 Jun. 5, 2025

(30) Foreign Application Priority Data

Dec. 4, 2023 (DE) .......................... 102023212118.2

(51) Int. Cl.
F16H 48/10 (2012.01)
B60K 1/00 (2006.01)

(52) U.S. Cl.
CPC .............. F16H 48/10 (2013.01); B60K 1/00 (2013.01); *B60K 2001/001* (2013.01); *F16H 2048/106* (2013.01)

(58) Field of Classification Search
CPC .............. F16H 2048/104; F16H 48/10; F16H 2048/106; F16H 57/037; B60K 1/00; B60K 2001/001
See application file for complete search history.

(56) References Cited

U.S. PATENT DOCUMENTS

| | | | | |
|---|---|---|---|---|
| 5,718,300 | A * | 2/1998 | Frost ..................... | F16H 37/082 |
| | | | | 180/65.6 |
| 5,845,732 | A * | 12/1998 | Taniguchi .............. | B60K 17/16 |
| | | | | 180/65.6 |
| 10,300,905 | B2 * | 5/2019 | Holmes ................... | F16H 48/10 |
| 2014/0141918 | A1 * | 5/2014 | Fukami ................ | B60K 17/165 |
| | | | | 475/150 |
| 2022/0205520 | A1 * | 6/2022 | Beck ........................ | B60K 1/00 |

* cited by examiner

*Primary Examiner* — Derek D Knight
(74) *Attorney, Agent, or Firm* — Dority & Manning, P.A.

(57) ABSTRACT

A differential transmission for a vehicle has a first planetary gearset and a second planetary gearset, where the first ring gear is in torque-proof connection with the second sun gear. The transmission further includes a first output shaft in torque-proof connection with the first planet carrier at a first side of the first planet gear in an axial direction, a second output shaft in torque-proof connection with the second ring gear, and a stationary component, with the second planet carrier being supported on the stationary component. The transmission additionally includes a support for rotatably supporting the first planet carrier on the stationary component, the support for the first planet carrier being at a second side of the first planet gear in the axial direction, the second side being opposite the first side relative to the first planet gear.

13 Claims, 8 Drawing Sheets

DIFFERENTIAL TRANSMISSION FOR A VEHICLE

CROSS-REFERENCE TO RELATED APPLICATION

The present application is related and has right of priority to German Patent Application No. 10 2023 212 118.2 filed on Dec. 4, 2023, the entirety of which is incorporated by reference for all purposes.

FIELD OF THE INVENTION

The present invention relates generally to a differential transmission for a vehicle. Furthermore, the present invention relates generally to a drive unit with a differential transmission, and generally to a vehicle with a drive unit.

BACKGROUND

Differential transmissions are often used in vehicles. Differential transmissions are used in order to enable drive wheels driven by the same motor to have different rotational speeds. This is required, for example, when cornering. The drive wheel on the inside of the curve covers a shorter path than the drive wheel at the outside of the curve. Therefore, the drive wheel at the inside of the curve has to rotate more slowly than the drive wheel at the outside of the curve.

SUMMARY OF THE INVENTION

An improved differential transmission which has an extended service life, can be produced more cost-effectively, and requires less installation space is provided.

A differential transmission for a vehicle includes a first output shaft, a second output shaft, a first planetary gearset, a second planetary gearset, and a stationary component. The first output shaft and the second output shaft may extend out of the stationary component in an axial direction. In this case, the axial direction may be determined by the axis of rotation of the first output shaft. The first output shaft and the second output shaft may be coaxial with one another. The vehicle may be, for example, a commercial vehicle, such as a truck, a construction machine, or agricultural machine, or a passenger car.

The first planetary gearset has a first sun gear, a first planet carrier, a first planet gear, and a first ring gear. The first planetary gearset may have a plurality of planet gears, preferably three planet gears. The first planetary gearset is a plus or a minus planetary gearset. The first sun gear is in engagement with the first planet gear, and the first planet gear is in engagement with the first ring gear. An engagement between two gear wheels is achieved by an overlap of the gear wheels in the axial direction and a spacing of the axes of rotation of the gear wheels in a radial direction, such that at least one tooth of the one gear wheel contacts a tooth of the second gear wheel. The first sun gear, the first planet carrier, and the first ring gear may be arranged coaxially with one another. The first sun gear may be used to drive the first planetary gearset.

The first planet carrier may be used as an output and is connected to the first output shaft by a torque-proof connection. The torque-proof connection may be arranged adjacent to the second output shaft in the region of an end of the first output shaft which is located within the stationary component. The first output shaft may be arranged coaxially to the first sun gear.

If two elements are connected to one another, they are directly or indirectly coupled to one another in such a way that a movement of the one element causes a reaction of the other element. For example, a connection may be provided by a form-fit or friction-fit connection. The connection may correspond to a meshing of corresponding toothings of the two elements. In this case, further elements, for example one or a plurality of spur gear stages, may be provided between the elements. For example, a connection may be torque-proof.

A torque-proof connection of two elements is understood to mean a connection in which the two elements are rigidly coupled to one another in all intended states of the transmission, so that they have substantially the same rotational speed. In this case, the elements may be present as individual components in torque-proof connection to one another or else in one piece. A torque-proof connection may be a splined shaft connection or a toothed shaft connection. In this case, a securing element, for example a securing ring, snap ring, or spiral ring, may be provided for limiting a relative movement in the axial direction. The torque-proof connection may be by a press connection or by screw connections of flanges of the first planet carrier and the first output shaft.

The first planet carrier is rotatably supported at the stationary component by a support. The support of the first planet carrier is arranged opposite the torque-proof connection in the axial direction with respect to the first planet gear. The axial direction may be the axial direction of a planet axle at the first planet carrier on which the first planet gear is rotatably supported. The support of the first planet carrier may be a needle sleeve without an inner ring. A bushing may be present within the needle sleeve. The bushing may be dispensed with if the first planet carrier is produced at least in sections from hardened steel.

As a result, the first planet carrier may be thinner and the service life of the differential transmission may be extended. In this case, no oil has to be guided between the first output shaft and the second output shaft. As a result, the second output shaft is not weakened and may be thinner-walled, which leads to a lower weight. In addition, corresponding sealing elements may be dispensed with, which leads to a cost advantage, an installation space advantage, and a weight advantage. No direct oil supply through the stationary component to the support of the second output shaft is necessary, since in total fewer supports require oil.

The second planetary gearset has a second sun gear, a second planet carrier, a second planet gear, and a second ring gear. The second planetary gearset may have a plurality of planet gears, preferably three planet gears. The second planetary gearset is a plus or a minus planetary gearset. The second sun gear is in engagement with the second planet gear, and the second planet gear is in engagement with the second ring gear. The second sun gear, the second planet carrier, and the second ring gear may be arranged coaxially with one another and coaxially with the first sun gear, the first planet carrier, and the first ring gear. The second ring gear is in torque-proof connection with the second output shaft. The connection of the second ring gear to the second output shaft may be by a press connection or by a screw connection in the axial direction of the second planet carrier to the second ring gear or by a shaft-hub connection.

The first ring gear is in torque-proof connection with the second sun gear. The first ring gear may be in torque-proof connection with the second sun gear, for example, by a claw connection, by a toothed shaft connection, or by screw connections.

The second planet carrier is supported at the stationary component. The supporting of the second planet carrier at the stationary component may be by a press connection, by material bond, or by screw connection of the second planet carrier in the axial direction to the stationary component. Alternatively, the second planet carrier may be fixable to the stationary component via a switching element. A torque-proof connection between two elements may be selectively established or released via a switching element, for example a clutch. The second planet carrier may have a second planet axle at which the second planet gear is rotatably supported. The second planet axle may be supported at the stationary component. A cylindrical projection of the stationary component may form the second planet axle.

The stationary component may be a transmission housing. The transmission housing may completely surround the first planetary gearset and the second planetary gearset. The transmission housing may have a recess in order to enable a mechanical connection from outside the transmission housing to the first sun gear. In addition, the transmission housing may have recesses in order to enable an extension of the first output shaft and the second output shaft to the outside of the transmission housing.

In an embodiment, the support of the first planet carrier may be supported at a cylindrical outer circumference of a section of the stationary component. For example, the cylindrical outer circumference may be provided at a cylindrical projection which projects in the axial direction from the stationary component. An intermediate element may also be provided which provides the cylindrical outer circumference and which is supported at the stationary component. An outer circumference of the support of the first planet carrier is provided at a cylindrical inner circumference of a section of the first planet carrier. An intermediate element may also be provided which provides the cylindrical inner circumference and which is supported at the first planet carrier.

In an embodiment, the support of the first planet carrier may be supported at a cylindrical inner circumference of a section of the stationary component. For example, the cylindrical inner circumference may be provided in a bore or depression in the axial direction in the stationary component. An intermediate component may also be provided which provides the cylindrical inner circumference and which is supported at the stationary component. An inner circumference of the support of the first planet carrier is provided at a cylindrical outer circumference of a section of the first planet carrier. An intermediate component may also be provided which provides the cylindrical outer circumference and which is supported at the first planet carrier.

In an embodiment, the first output shaft may be rotatably supported at the second output shaft by a support. The support of the first output shaft may be arranged opposite the support of the first planet carrier in the axial direction with respect to the first planet gear. The first output shaft may extend within the second output shaft in sections. An outer circumference of a section of the first output shaft and an inner circumference of a section of the second output shaft may form a gap. The support of the first output shaft may be arranged in the gap. The support of the first output shaft may have a floating bearing. For example, a needle bearing or a plain bearing may form the floating bearing of the first output shaft. As a result, the support of the first planet carrier may be improved, and the service life of the differential transmission may be extended.

In an embodiment, the support of the first output shaft may be arranged between the first planet carrier and the second output shaft. In other words, the first output shaft may be indirectly supported by the support of the first output shaft. An outer circumference of a section of the first planet carrier and an inner circumference of a section of the second output shaft may form a gap. The support of the first output shaft may be arranged in the gap. The first output shaft may be supported at the first planet carrier, for example by the torque-proof connection. The first output shaft is then supported at the second output shaft via the first planet carrier by the support of the first output shaft.

The first output shaft may be rotatably supported by a support which is arranged on the side of the support of the first planet carrier in the axial direction with respect to the first planet gear. For example, the support of the first output shaft may rotatably support the first output shaft at the stationary component.

In an embodiment, the second planetary gearset may be arranged offset in the axial direction with respect to the first planetary gearset. The second planetary gearset may be arranged completely outside the first planetary gearset in the axial direction. The first planetary gearset may overlap the first output shaft in the axial direction. The second planetary gearset may overlap the second output shaft in the axial direction. The second planetary gearset may be offset in the axial direction with respect to the second output shaft.

In an embodiment, the second sun gear may be arranged within the first ring gear in the radial direction. A diameter of the second sun gear may be less than a diameter of the first ring gear. As a result, a compact design of the differential transmission is possible in the radial direction.

In an embodiment, the differential transmission may have a sun ring gear which forms the first ring gear at an inner circumference and the second sun gear at an outer circumference. The first planetary gearset may overlap the second planetary gearset in the axial direction. All the gearset elements may be arranged in the same plane in the axial direction. All the gearset elements may be aligned with one another in the axial direction so that the corresponding toothings engage one another. The first planetary gearset and the second planetary gearset may overlap the first output shaft in the axial direction.

The sun ring gear may be configured in one piece. In an alternative embodiment, the sun ring gear may be configured in multiple parts. In this case, the sun ring gear has the first ring gear, the second sun gear, and a coupling element. The first ring gear may then be in torque-proof connection with an inner circumference of the coupling element. The second sun gear may then be in torque-proof connection with an outer circumference of the coupling element.

The sun ring gear may be configured in an annular manner. The first ring gear may be arranged radially within the second sun gear, and the first ring gear may overlap the second sun gear in the axial direction. The first ring gear and the second sun gear may overlap such that the gear having the smaller extension in the axial direction is arranged within the other gear. For example, the second sun gear may be wider in the axial direction than the first ring gear. The first ring gear may then be arranged within the second sun gear in the axial direction, such that the first ring gear does not protrude from the second sun gear in the axial direction.

In an embodiment, the differential transmission may have an input element which may be in torque-proof connection with the first sun gear and which may be rotatably supported at the stationary component by a support. The torque-proof connection between the input element and the first sun gear may be by a shaft-hub connection, by a press connection, or by screw connections of flanges of the sun gear and of the input element.

The support of the first planet carrier may overlap the support of the input element in the axial direction. In particular, this embodiment may be used in combination with the arrangement of the support of a section of the first planet carrier in the radial direction outside the support of the input element. Furthermore, this embodiment may be used in particular in combination with the backing of the support of the first planet carrier at the cylindrical outer circumference of a section of the stationary component. For example, the support of the input element may be arranged completely within the support of the first planet carrier in the axial direction. In this case, a very compact design of the differential transmission in the axial direction is possible.

In an embodiment, the support of the first planet carrier may be arranged next to the support of the input element in the axial direction. In particular, this embodiment may be used in combination with the backing of the support of the first planet carrier at the cylindrical inner circumference of a section of the stationary component. This enables a simpler oil supply to the support of the first planet carrier. In this embodiment, the diameter of the cylindrical inner circumference of a section of the stationary component may be selected to be small. It is advantageous here that small support diameters lead to low friction losses. Therefore, the efficiency of the differential transmission may be increased.

Furthermore, a bushing of hardened steel may be provided at the cylindrical outer circumference of a section of the first planet carrier. The first planet carrier may then be produced, for example, from aluminum. Alternatively, a section of the first planet carrier may serve as a running surface for the support of the first planet carrier. The planet carrier may be produced, for example, at least in sections from hardened steel. A separate bushing of hardened steel, which serves as a running surface for rolling elements of the support of the first planet carrier, may then be omitted at a cylindrical outer circumference of a section of the first planet carrier. This reduces the number of components of the differential transmission and enables a simple construction.

A cylindrical recess in the stationary component for a bearing seat, at which an outer ring of the support of the input element is mounted, may be used to form a bearing seat, at which an outer ring of the support of the first planet carrier is mounted. In other words, two bearing seats may be produced in the stationary component with one machining step. This reduces production costs. A circumference of a bearing seat for the support of the input shaft may be greater than a circumference of a bearing seat for the support of the first planet carrier.

The first sun gear may be configured to be hollow. For example, the first sun gear may be configured to be annular. In this case, the first output shaft may extend through the first sun gear and coaxially to the first sun gear. As a result, a compact design of the differential transmission is possible.

The input element may be a hollow shaft, wherein the first output shaft may extend through the input element. The first sun gear, the input element, and the first output shaft may be arranged coaxially. As a result, a compact design of the differential transmission may be realized.

The input element and the first sun gear may be formed in one piece. In other words, the input element may form the first sun gear. As a result, the number of components of the differential transmission may be reduced, and a compact design of the differential transmission may be realized.

The second output shaft may be arranged coaxially to the first output shaft and opposite the first output shaft in the axial direction with respect to the stationary component. The first output shaft and the second output shaft may each extend as far as a drive wheel, a wheel hub or a joint shaft of the vehicle. As a result, a compact design of the differential transmission is possible, and the number of components of the differential transmission may be reduced. A torque introduced into the first sun gear may be transmittable to the first output shaft and to the second output shaft.

The first output shaft and the second output shaft may each be rotatably supported at the stationary component by a support. The supports of the first output shaft and the second output shaft may be arranged coaxially with one another. The second output shaft may have a first support and a second support. The first support may be a floating bearing. The second support may be a fixed bearing. The first support of the second output shaft may be arranged outside (e.g., spaced apart from) the support of the first planet carrier in the radial direction. The first support of the second output shaft may overlap the support of the first planet carrier in the radial direction. The first support of the second output shaft and the support of the first planet carrier may be configured identically. The second support of the second output shaft may be arranged within the support of the first planet carrier in the radial direction.

In an embodiment, a securing element for axially securing the support of the first planet carrier may be arranged between the support of the first planet carrier and the support of the input element. The securing element may be a securing ring or snap ring. This embodiment may be used in particular in combination with a support of the first planet carrier which is arranged next to the support of the input element. A shoulder for positioning the support of the first planet carrier in the axial direction may be provided. The shoulder may be arranged opposite the securing element with respect to the support of the first planet carrier. The support of the first planet carrier is thus easy to assemble.

In an aspect, a drive unit has a motor and a differential transmission according to the previously described embodiments. The motor is coupled with the differential transmission in order to drive the first sun gear.

In one aspect, a vehicle has a drive unit according to the previously described embodiment and drive wheels. The drive unit is mounted in the vehicle in order to drive the drive wheels.

DETAILED DESCRIPTION

Figure 1:
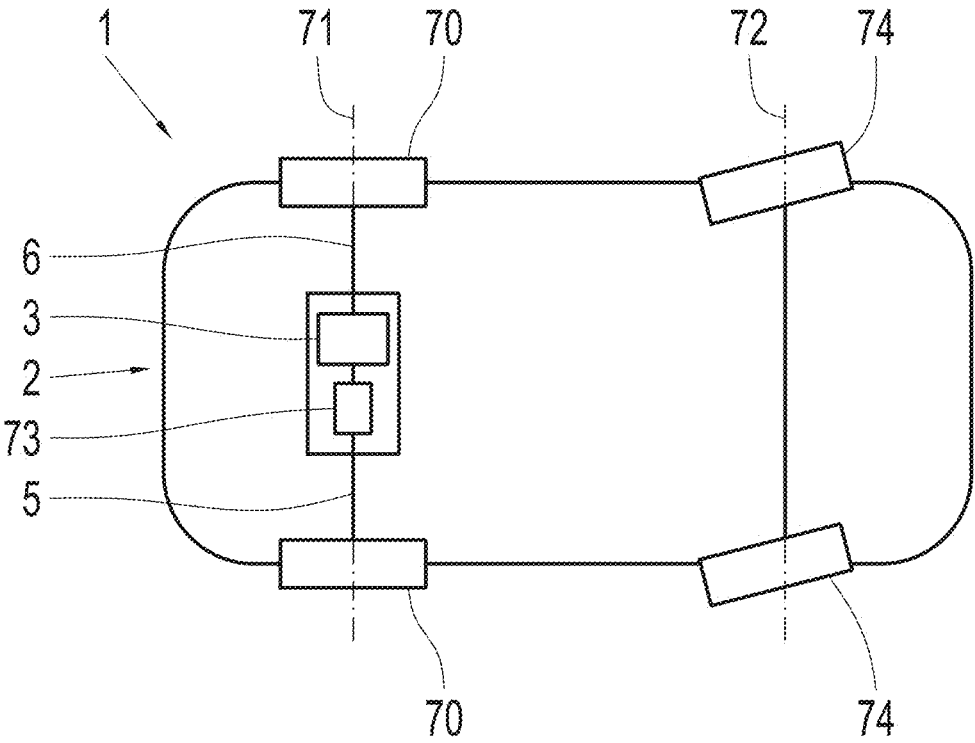
FIG. 1 shows a top view of a vehicle according to an embodiment.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a top view of a vehicle 1 in accordance with aspects of the present subject matter. The vehicle 1 has a drive unit 2 with a motor 73, a differential transmission 3 with a first output shaft 5 and a second output shaft 6, drive wheels 70, a first axle 71, and a second axle 72. The motor 73 is an electric motor in the present embodiment. In an alternative embodiment, the motor 73 is an internal combustion engine. The motor 73 is connected to the differential transmission 3 such that the motor 73 may drive the first output shaft 5 and the second output shaft 6 by the differential transmission 3 and divide its driving power.

The first output shaft 5 and the second output shaft 6 extend from the differential transmission 3 in opposite directions parallel to the first axle 71 towards the drive wheels 70. The first output shaft 5 extends through the transmission 3 and the motor 73. The first axle 71 is a driven rear axle of the vehicle 1 in the present case. In an alternative embodiment, the first axle 71 may be a driven front axle of the vehicle 1. The first output shaft 5 and the second output shaft 6 are connected to the drive wheels 70 of the vehicle 1 such that the first output shaft 5 and the second output shaft 6 may each drive one of the drive wheels 70.

One of the drive wheels 70 transmits a driving power of the motor 73 to a ground on which the drive wheels 70 rest and generates a travelling movement of the vehicle 1. Steerable wheels 74 of the vehicle 1 are rotatably arranged at a second axle 72, in the present case a front axle. In an alternative embodiment, the second axle 72 may be a rear axle of the vehicle 1.

In a further embodiment, joints and wheel hubs may be arranged between the respective drive wheels 70 and the first output shaft 5 and the second output shaft 6 in order to compensate for possible misalignment of the first output shaft 5 and the second output shaft 6.

Figure 2:
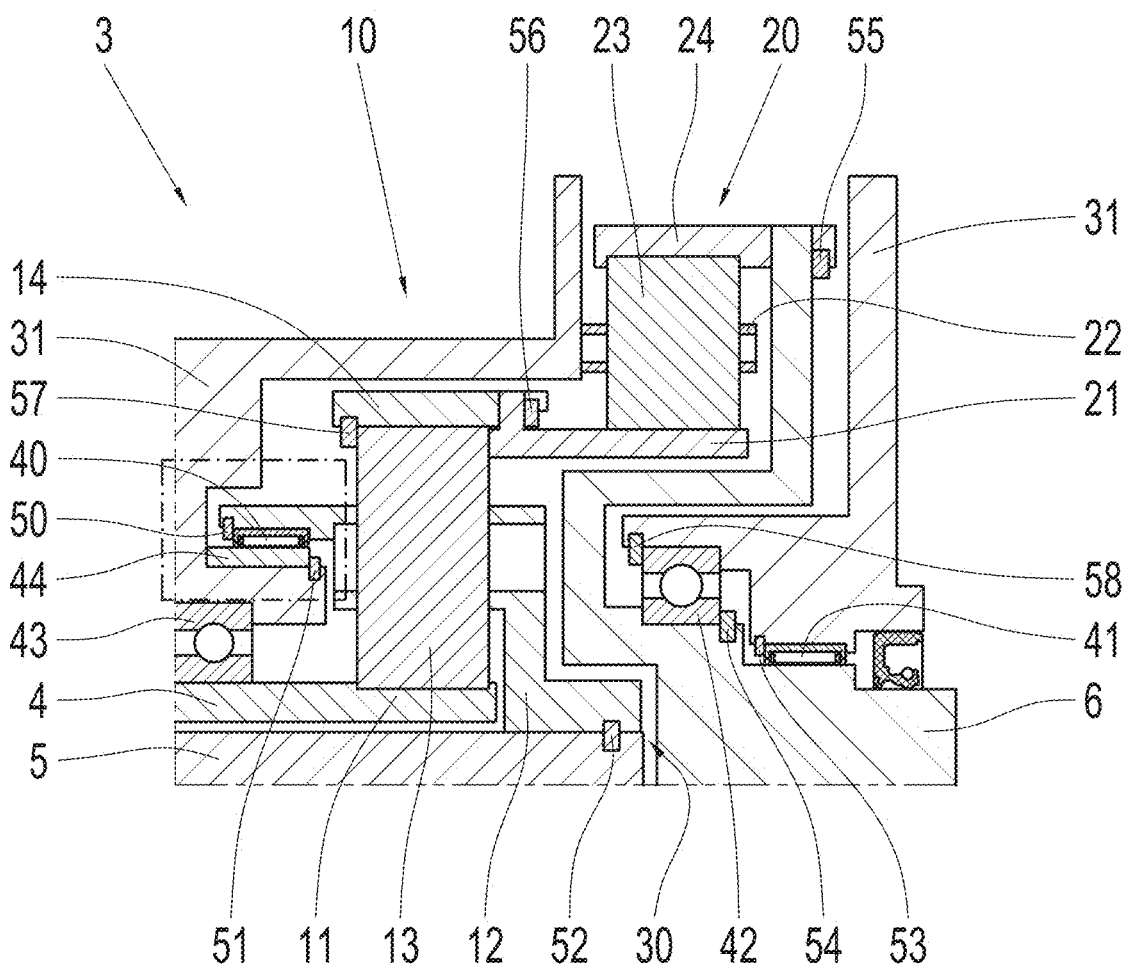
FIG. 2 shows a sectional view of a differential transmission for a vehicle according to example aspects of an embodiment.

FIG. 2 shows a sectional view of a differential transmission 3 for a vehicle 1 according to an embodiment. FIG. 2 is a half-section showing an upper part of the differential transmission 3. The differential transmission 3 has a stationary component 31, an input element 4, a first output shaft 5, and a second output shaft 6. The first output shaft 5 and the second output shaft 6 extend out of the stationary component 31 in opposite directions. The differential transmission 3 further has a first planetary gearset 10 with a first sun gear 11, a first planet carrier 12, a number of first planet gears 13, and a first ring gear 14. The first planet gears 13 are each rotatably supported by a first planet axle. The first planet carrier 12 is supported in the stationary component 31 by a support 40. The first sun gear 11 is in engagement with the first planet gears 13. The first planet gears 13 are in engagement with the first ring gear 14. The differential transmission 3 further has a second planetary gearset 20 with a second sun gear 21, a second planet carrier 22, a number of second planet gears 23, and a second ring gear 24. The second planet gears 23 are each rotatably supported by a second planet axle. The second sun gear 21 is in engagement with the second planet gears 23. The second planet gears 23 are in engagement with the second ring gear 24. The first sun gear 11, the first planet gears 13, and the first ring gear 14 overlap in an axial direction. Furthermore, the second sun gear 21, the second planet gears 23, and the second ring gear 24 overlap in the axial direction. The first planetary gearset 10 is arranged offset in the axial direction with respect to the second planetary gearset 20. The first planetary gearset 10 overlaps the first output shaft 5 and the input element 4 in the axial direction. The second planetary gearset 20 overlaps the second output shaft 6 in the axial direction. In an alternative embodiment, the second planetary gearset 20 partially overlaps the second output shaft 6 in the axial direction. In an alternative embodiment, the second planetary gearset is offset in the axial direction with respect to the second output shaft 6.

The support 40 of the first planet carrier 12 is described in more detail below.

The support 40 of the first planet carrier 12 is arranged, with respect to the first planet gears 13 of the first planetary gearset 10, opposite a torque-proof connection 30 of the first planet carrier 12 with the first output shaft 5 in the axial direction. The first planet carrier 12 is thus supported on both sides in the axial direction with respect to the first planet gears 13. A radial force from one of the first planet gears 13 may thus be distributed to the support 40 of the first planet carrier 12 and the torque-proof connection 30. This leads to a more uniform force distribution in the first planet carrier 12 and to an exact positioning of the first planet gears 13 at the first planet carrier 12.

The support 40 of the first planet carrier 12 is, in the present case, a needle sleeve without an inner ring. The support 40 of the first planet carrier 12 further has a bushing 44, in the present case a hardened steel sleeve. The bushing 44 is arranged radially within the needle sleeve. Needles of the needle sleeve may thus roll at the bushing 44. The bushing 44 is positioned such that it projects beyond the needle sleeve in the axial direction. The width of the bushing 44 in the axial direction is greater than the width of the needle sleeve. The bushing 44 of the support 40 of the first planet carrier 12 may be dispensed with if the stationary component is produced at least in sections from hardened steel and is at least in sections hardened.

Further details of the embodiment are described below.

The differential transmission 3 further has an input element 4. The input element 4 is rotatably supported at the stationary component 31 by a support 43.

The support 40 of the first planet carrier 12 overlaps the support 43 of the input element 4 in the axial direction. In this case, the support 40 of the first planet carrier 12 is arranged outside the support 43 of the input element 4 in a radial direction. A compact installation space of the differential transmission 3 in the axial direction may thus be achieved.

The input element 4 is a hollow shaft. The input element 4 may rotate about its central axis. The input element 4 is in torque-proof connection with a rotor shaft of the motor 73 and is driven therewith, where the rotor shaft of the motor 73 is not shown in FIG. 2. The first sun gear 11 is configured to be hollow and in one piece with the input element 4. The first output shaft 5 extends through the first sun gear 11 and the input element 4 and is coaxial (e.g., parallel) to the first sun gear 11.

The first ring gear 14 is in torque-proof connection with the second sun gear 21 by a claw connection, such as, for example, a crown toothing. The first ring gear 14 and the second sun gear 21 are positioned relative to one another in the axial direction by a securing element 56, in the present case a snap ring. In an alternative embodiment, the first ring gear 14 is in torque-proof connection with the second sun gear 21 by a toothed shaft connection or by screw connections. The second sun gear 21 is arranged within the first ring gear 14 in the radial direction. The second planet carrier 22 is supported in a torque-proof manner at the stationary component 31 by the second planet carrier 22 being fastened to the stationary component 31 in the axial direction. The second ring gear 24 is in torque-proof connection with the second output shaft 6. The first output shaft 5 and the second output shaft 6 are configured coaxially with one another and are rotatably supported in the stationary component 31.

In a further embodiment which includes all the features of the preceding embodiment, the stationary component 31 is a two-part transmission housing. A detail of a first part of the two-part transmission housing is shown in FIG. 2 on the left side of the differential transmission 3. A detail of a second part of the two-part transmission housing is shown in FIG. 2 on the right side of the differential transmission 3. The two parts of the two-part transmission housing are circumferentially connected to one another by screw connections, where the screw connections are not shown in FIG. 2.

In a further embodiment which includes all the features of the preceding embodiment, the support 40 of the first planet carrier 12 is a floating bearing. The support 43 of the input element 4 is in the present case a grooved ball bearing and is a fixed bearing. The first output shaft 5 is rotatably supported in the stationary component 31 by a support which is not shown. The support of the first output shaft 5, in the present case a grooved ball bearing, is a fixed bearing.

The second output shaft 6 is rotatably supported at the stationary component 31 by a first support 41 and a second support 42. The first support 41 of the second output shaft 6, in the present case a needle bearing, is a floating bearing. The second support 42 of the second output shaft 6, in the present case a grooved ball bearing, is a fixed bearing. In an alternative embodiment, the first support 41 is a fixed bearing and the second support 42 is a floating bearing.

In a further embodiment which includes all the features of the preceding embodiment, the width of the first sun gear 11 in the axial direction is greater than the width of the first planet gears 13. Furthermore, the width of the ring gear 14 and the sun gear 21 (e.g., of the sun ring gear 32) in the axial direction is greater than the width of the first planet gears 13 and the second planet gears 23, respectively. Furthermore, for positioning the ring gear 14 and the sun gear 21 (e.g., of the sun ring gear 32) relative to the first planet gears 13 in the axial direction, securing elements 56, 57, in the present case snap rings, and thrust washers are provided at an inner circumference of the sun ring gear 32 on both sides of the first planet gears 13.

In a further embodiment which includes all the features of the preceding embodiment, an outer ring of the needle sleeve of the support 40 of the first planet carrier 12 is positioned in the axial direction by a shoulder of the first planet carrier 12 and a securing element 50, in the present case a snap ring. The bushing 44 is positioned in the axial direction by a shoulder of the stationary component 31 and a securing element 51, in the present case a securing ring.

An outer ring of the first support 41 of the second output shaft is positioned in the axial direction by a shoulder in the stationary component 31 and by a securing element 53, in the present case a snap ring. An outer ring of the second support 42 is positioned in the axial direction by a shoulder in the stationary component 31 and a securing element 58, in the present case a snap ring. An inner ring of the second support 42 is positioned in the axial direction by a shoulder in the second output shaft 6 and a securing element 54, in the present case a snap ring.

The width of the second ring gear 24 is greater than the width of the second planet gears 23. For the torque-proof connection of the second ring gear 24 to the second output shaft 6, the second ring gear 24 and the second output shaft 6 in the present case each has a toothing of a shaft-hub connection. In addition, the torque-proof connection has a securing element 55, in the present case a snap ring, for relative positioning in the axial direction.

In a further embodiment which includes all the features of the preceding embodiment, the torque-proof connection 30 of the first planet carrier 12 with the first output shaft 5 includes a securing element 52, in the present case a snap ring, for axial relative positioning. The torque-proof connection 30 is, in the present case, a toothed shaft connection. In an alternative embodiment, the torque-proof connection 30 is formed by screw connections.

In a further embodiment which includes all the features of the preceding embodiment, the input element 4 in the present embodiment is formed in one piece with the rotor shaft and is rotatably supported at the stationary component 31 via a rotor support. In an alternative embodiment, the input element 4 has a toothing for a shaft-hub connection for a torque-proof connection of the input element 4 to the rotor shaft.

Figure 3:
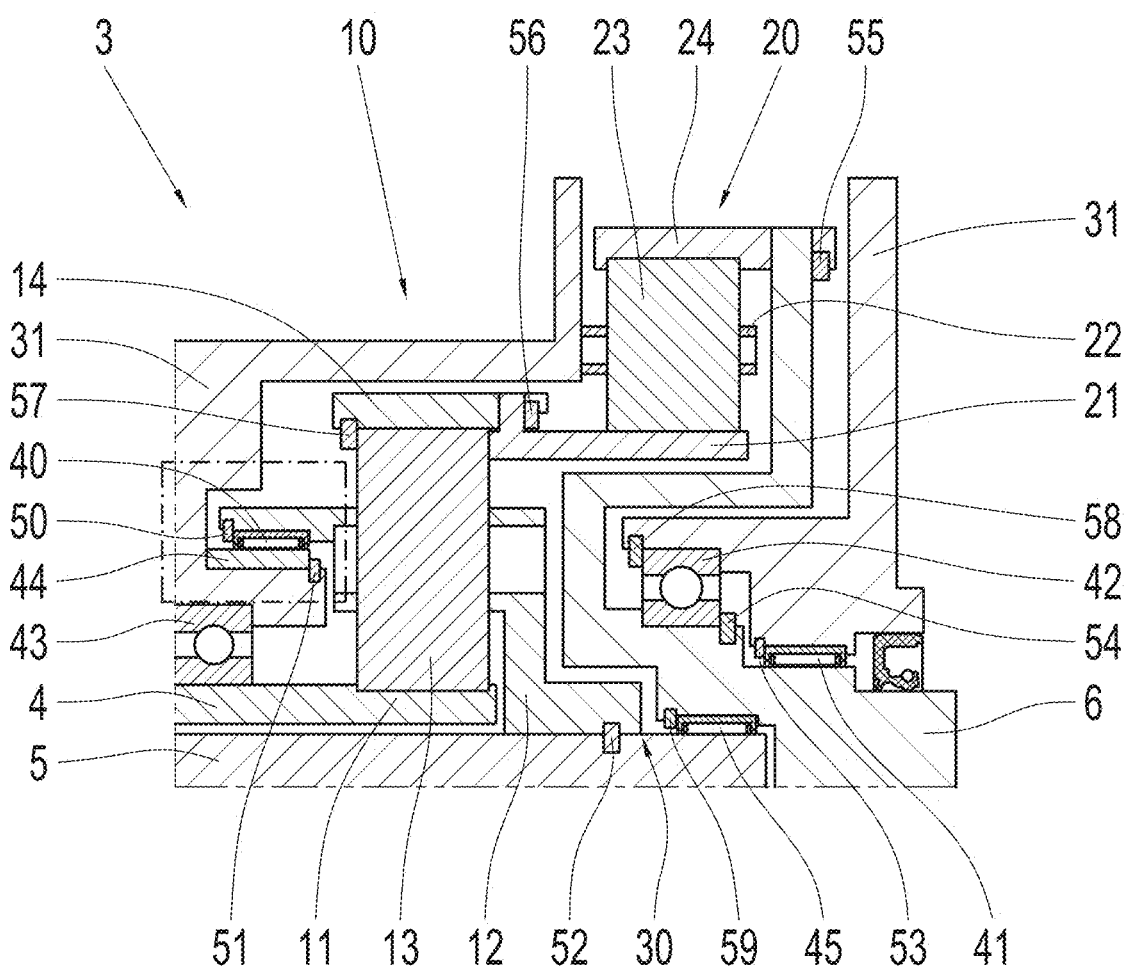
FIG. 3 shows a sectional view of a differential transmission for a vehicle according to example aspects of an embodiment.

FIG. 3 shows a sectional view of a differential transmission 3 for a vehicle 1 according to an embodiment. The present embodiment differs from the embodiments described with respect to FIG. 2 in that the first output shaft 5 is rotatably supported at the second output shaft 6 by a support 45. The support 45 of the first output shaft 5 is a needle bearing and is a floating bearing. An outer ring of the support 45 is positioned in the axial direction by a shoulder in the second output shaft 6 and a securing element 59, in the present case a snap ring. In an alternative embodiment, the support 45 of the first output shaft 5 is a plain bearing. In an alternative embodiment, the support 45 of the first output shaft 5 is arranged between the first planet carrier 12 and the second output shaft 6. In this case, the first output shaft 5 is indirectly supported at the second output shaft 6 by the support 45 of the first output shaft 5.

Figure 4:
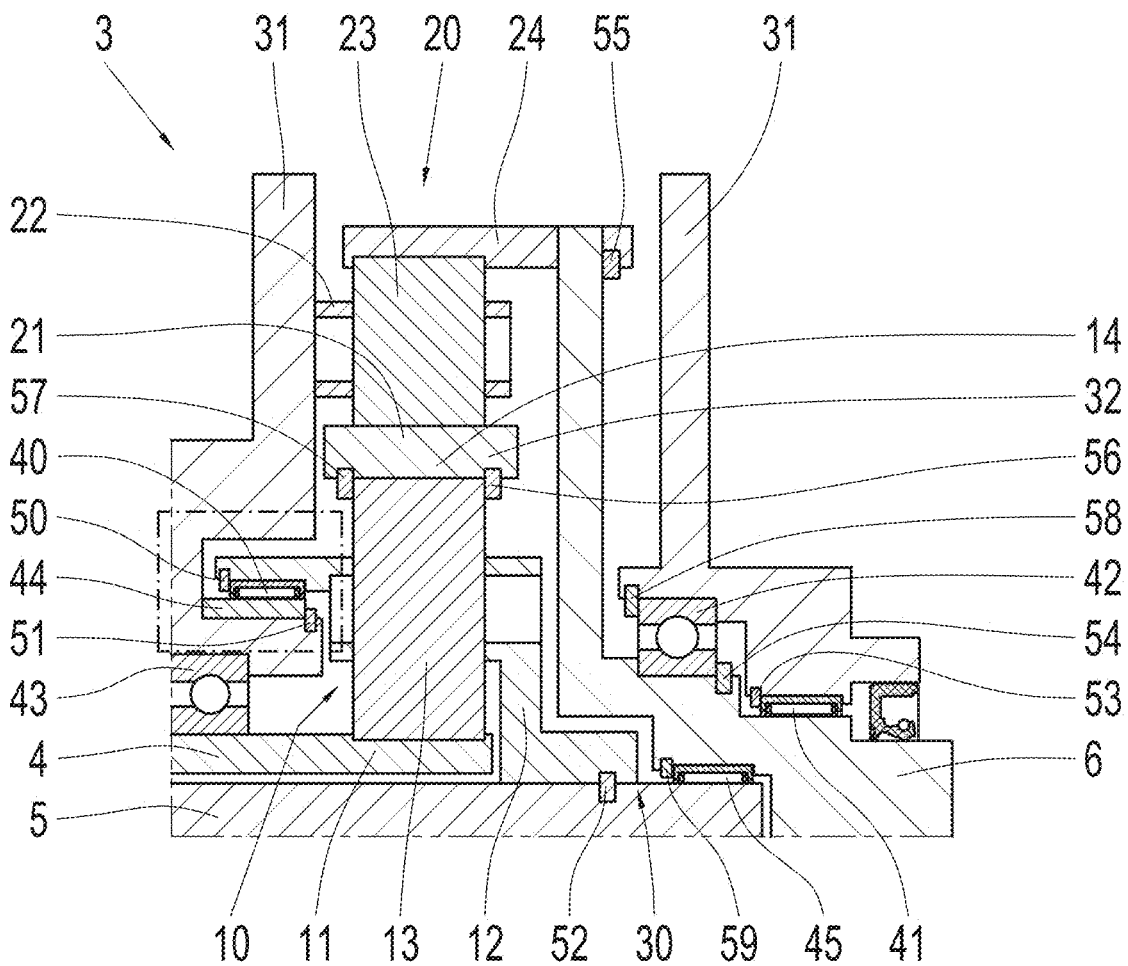
FIG. 4 shows a sectional view of a differential transmission for a vehicle according to alternative example aspects of an embodiment.

FIG. 4 shows a sectional view of a differential transmission 3 for a vehicle 1 according to an alternative embodiment. The present embodiment differs from the embodiments described with respect to FIG. 3 in that the first planetary gearset 10 overlaps the second planetary gearset 20 in the axial direction. The toothings of the first planetary gearset 10 and of the second planetary gearset 20 are aligned with one another in the axial direction, so that the corresponding toothings engage one another. In the present case, the differential transmission 3 has a sun ring gear 32 which is formed in one piece and which forms the first ring gear 14 at an inner circumference and the second sun gear 21 at an outer circumference.

Figure 5:
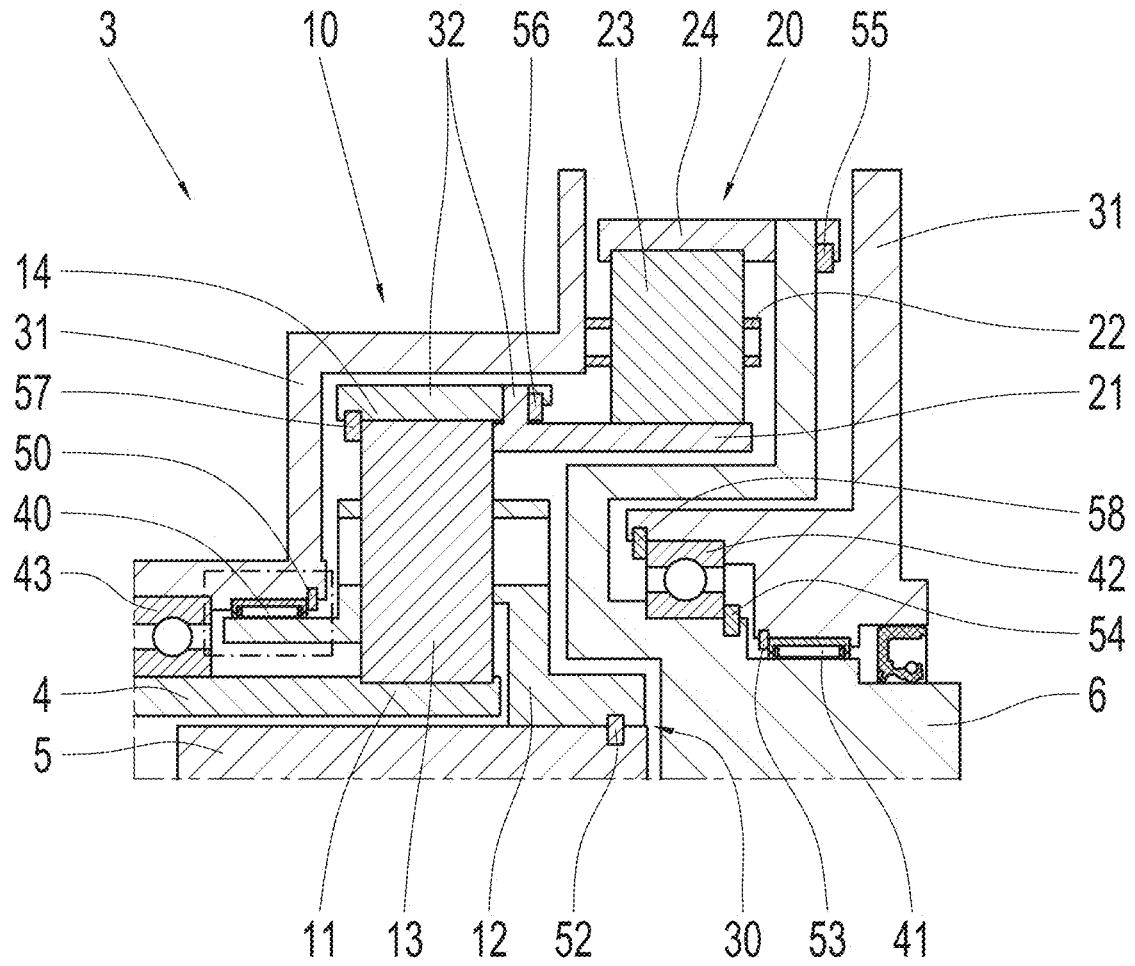
FIG. 5 shows a sectional view of a differential transmission for a vehicle according to alternative example aspects of an embodiment.

FIG. 5 shows a sectional view of a differential transmission 3 for a vehicle 1 according to an alternative embodiment. The present embodiment differs from the embodiments described with respect to FIG. 2 in that the support 40 of the first planet carrier 12 is backed at a cylindrical inner circumference of a section of the stationary component 31. The support 40 of the first planet carrier 12 is arranged next to the support 43 of the input element 4 in the axial direction. The support 40 of the first planet carrier 12 is arranged within or inwardly relative to the support 43 of the input element 4 in the radial direction. In an alternative embodiment, the support 40 of the first planet carrier 12 projects beyond the support 43 of the input element 4 in the radial direction. The bushing 44 of the support 40 of the first planet carrier 12 from FIG. 2 may be dispensed with in the present case of FIG. 5, as the first planet carrier 12 is produced at least in sections from hardened steel. In an alternative embodiment, the first planet carrier 12 is produced from aluminum. The bushing 44 is then provided at an outer circumference of a section of the first planet carrier 12.

In a further embodiment, the outer ring of the support 40 of the first planet carrier 12 is positioned in the axial direction by a shoulder of the stationary component 31 and a securing ring 50, in the present case a snap ring. In this case, the shoulder is arranged between the bearing 43 of the input element 4 and the bearing 40 of the first planet carrier 12.

Figure 6:
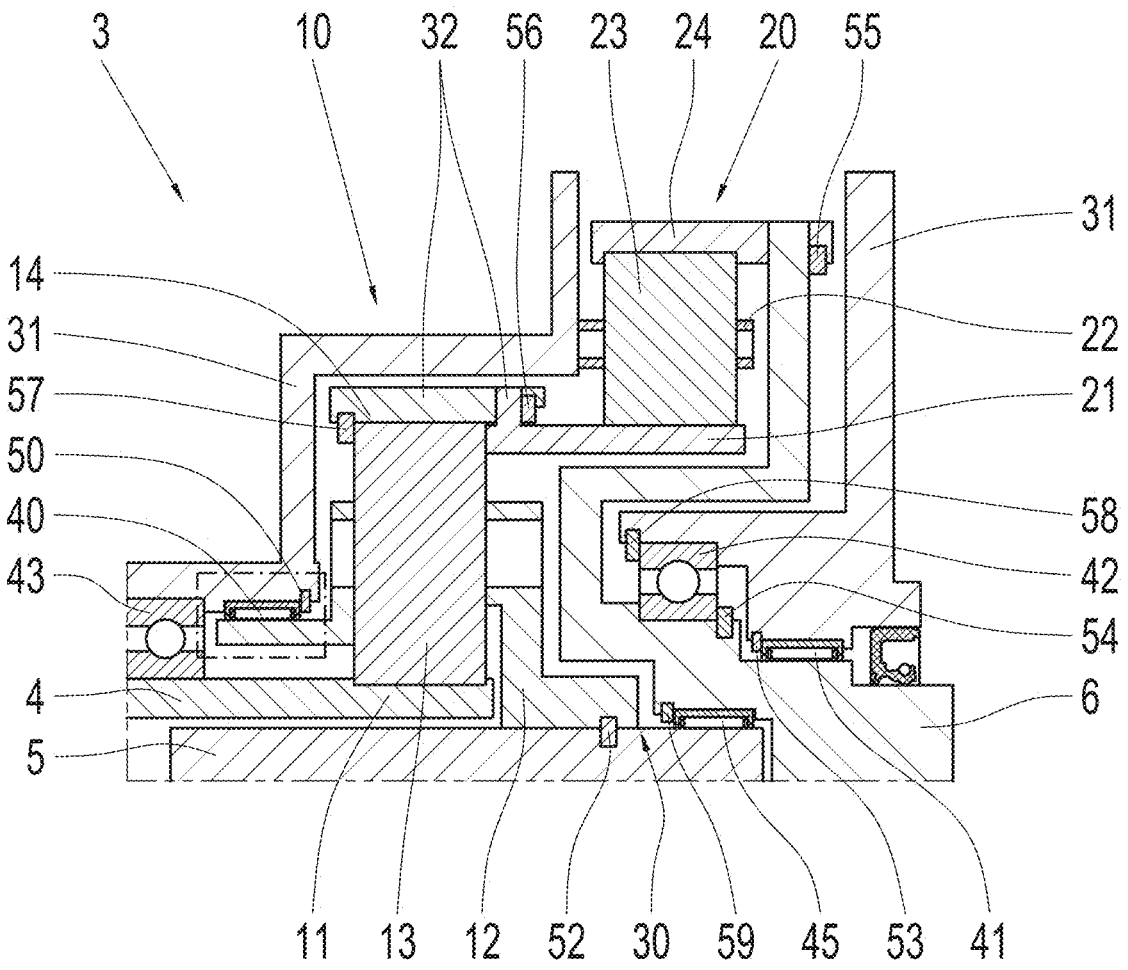
FIG. 6 shows a sectional view of a differential transmission for a vehicle according to example aspects of an embodiment.

FIG. 6 shows a sectional view of a differential transmission 3 for a vehicle 1 according to an embodiment. The present embodiment differs from the embodiments described with respect to FIG. 5 in that the first output shaft 5 is rotatably supported at the second output shaft 6 by a support 45. The support 45 of the first output shaft 5 is a needle bearing and is a floating bearing. In an alternative embodiment, the support 45 of the first output shaft 5 is a plain bearing.

Figure 7:
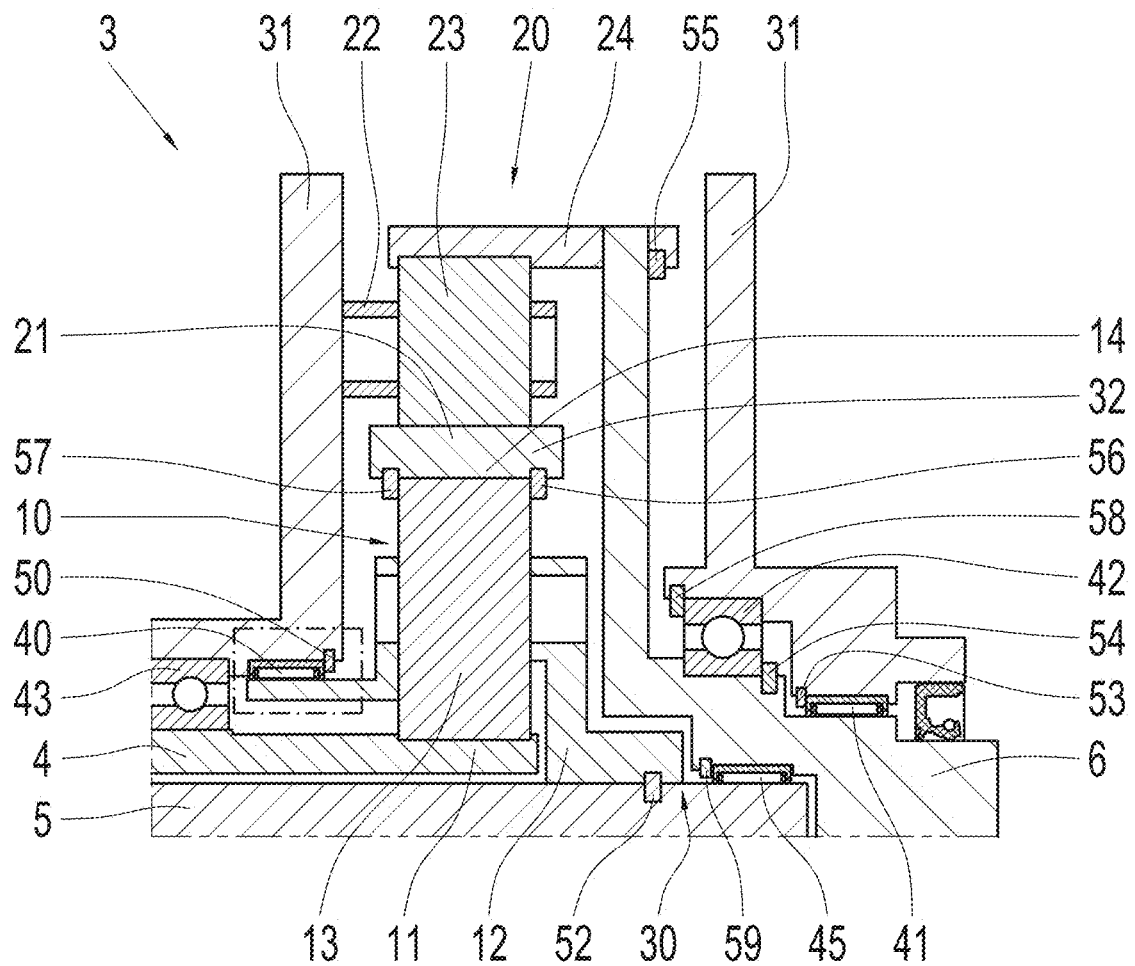
FIG. 7 shows a sectional view of a differential transmission for a vehicle according to alternative example aspects of an embodiment.

FIG. 7 shows a sectional view of a differential transmission 3 for a vehicle 1 according to an alternative embodiment. The present embodiment differs from the embodiments described with respect to FIG. 6 in that the first planetary gearset 10 overlaps the second planetary gearset 20 in the axial direction. The toothings of the first planetary gearset 10 and of the second planetary gearset 20 are aligned with one another in the axial direction, so that the corresponding toothings engage one another. In the present case, the differential transmission 3 has a sun ring gear 32 which is formed in one piece and which forms the first ring gear 14 at an inner circumference and the second sun gear 21 at an outer circumference.

Figure 8:
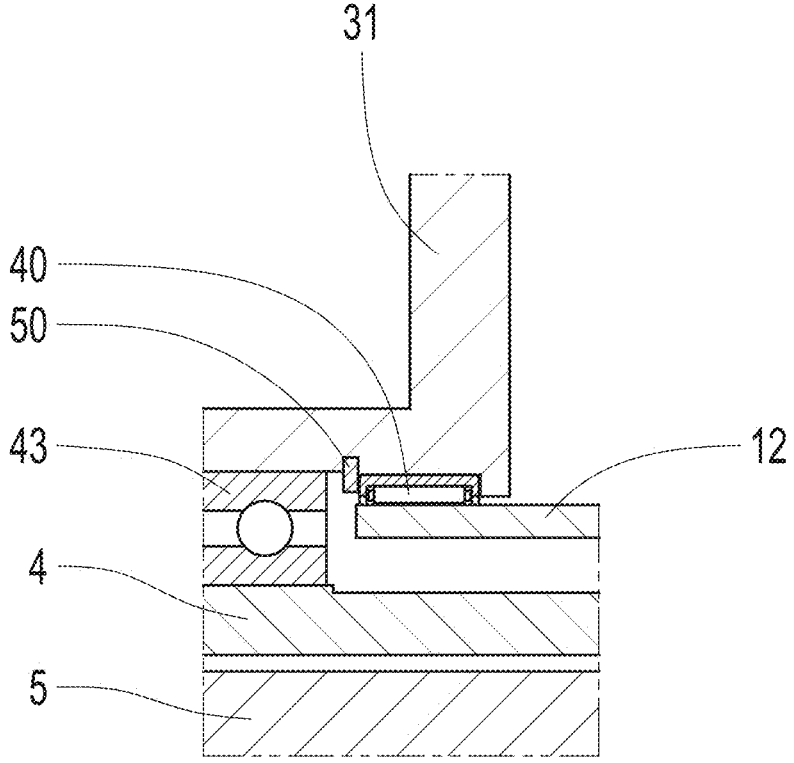
FIG. 8 shows a detailed view of a differential transmission for a vehicle according to alternative example aspects of an embodiment in a sectional view.

FIG. 8 shows a detailed view of a differential transmission 3 for a vehicle 1 according to an alternative embodiment in a sectional view. The present embodiment differs from the embodiments described with respect to FIGS. 5-7 in that the securing ring 50 and the shoulder of the support 40 are interchanged. The securing element 50 is arranged between the support 40 of the first planet carrier 12 and the support 43 of the input element 4. The outer diameter of the needle bearing of the support 40 of the first planet carrier 12 is smaller than the outer diameter of the grooved ball bearing of the support 43 of the input element 4.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE SIGNS 1 vehicle
2 drive unit
3 differential transmission
4 input element
5 first output shaft
6 second output shaft
10 first planetary gearset
11 first sun gear of the first planetary gearset
12 first planet carrier of the first planetary gearset
13 first planet gear of the first planetary gearset
14 first ring gear of the first planetary gearset
20 second planetary gearset
21 second sun gear of the second planetary gearset
22 second planet carrier of the second planetary gearset
23 second planet gear of the second planetary gearset
24 second ring gear of the second planetary gearset
30 torque-proof connection
31 stationary component
32 sun ring gear
40 support of the first planet carrier
41 first support of the second output shaft
42 second support of the second output shaft
43 support of the input element
44 bushing
45 support of the first output shaft
50, 51, 52, 53, 54, 55, 56, 57, 58, 59 securing element
70 drive wheel
71 first axle
72 second axle
73 motor
74 steerable wheel

The invention claimed is:

1. A differential transmission (3) for a vehicle (1), the differential transmission (3) comprising:

a first planetary gearset (10), the first planetary gearset (10) comprising a first sun gear (11), a first planet carrier (12), a first planet gear (13), and a first ring gear (14), the first sun gear (11) being in engagement with the first planet gear (13), the first planet gear (13) being in engagement with the first ring gear (14); and a second planetary gearset (20), the second planetary gearset (20) comprising a second sun gear (21), a second planet carrier (22), a second planet gear (23), and a second ring gear (24), the second sun gear (21) being in engagement with the second planet gear (23), the second planet gear (23) being in engagement with the second ring gear (24), the first ring gear (14) being in torque-proof connection with the second sun gear (21);

a first output shaft (5), the first planet carrier (12) being in torque-proof connection with the first output shaft (5) at a first side of the first planet gear (13) in an axial direction;

a second output shaft (6), the second ring gear (24) being in torque-proof connection with the second output shaft (6); and a stationary component (31), the second planet carrier (22) being supported on the stationary component (31), a support (40), the first planet carrier (12) being rotatably supported on the stationary component (31) by the support (40), the support (40) for the first planet carrier (12) being at a second side of the first planet gear (13) in the axial direction, the second side being opposite the first side relative to the first planet gear (13).

2. The differential transmission (3) of claim 1, wherein the support (40) for the first planet carrier (12) is supported on a cylindrical outer circumference of a section of the stationary component (31).

3. The differential transmission (3) according to claim 1, wherein the support (40) for the first planet carrier (12) is supported on a cylindrical inner circumference of a section of the stationary component (31).

4. The differential transmission (3) of claim 1, further comprising a further support (45), the first output shaft (5) being rotatably supported on the second output shaft (6) by the further support (45), the further support (45) for the first output shaft (5) is opposite the support (40) for the first planet carrier (12) in the axial direction with respect to the first planet gear (13).

5. The differential transmission (3) of claim 4, wherein the further support (45) for the first output shaft (5) is between the first planet carrier (12) and the second output shaft (6).

6. The differential transmission (3) of claim 4, wherein the second planetary gearset (20) is offset from the first planetary gearset (10) in the axial direction.

7. The differential transmission (3) of claim 6, wherein the second sun gear (21) is within the first ring gear (14) in a radial direction.

8. The differential transmission (3) of claim 1, further comprising a sun ring gear (32), the first ring gear (14) being formed at an inner circumference of the sun ring gear (32) and the second sun gear (21) being formed at an outer circumference of the sun ring gear (32), wherein the first planetary gearset (10) overlaps the second planetary gearset (20) in the axial direction.

9. The differential transmission (3) of claim 1, further comprising:

an input element (4), the input element (4) being in torque-proof connection with the first sun gear (11); and an input support (43), the input element (4) being rotatably supported at the stationary component (31) by the input support (43).

10. The differential transmission (3) of claim 9, wherein the support (40) for the first planet carrier (12) is next to the input support (43) for the input element (4) in the axial direction.

11. The differential transmission (3) of claim 10, further comprising a securing element (50) for axially securing the support (40) for the first planet carrier (12), the securing element (50) being between the support (40) for the first planet carrier (12) and the input support (43) for the input element (4) in the axial direction.

12. A drive unit (2), the drive unit (2) comprising:

a motor (73); and the differential transmission (3) of claim 1, the motor (73) being coupled with the differential transmission (3), the motor (73) being configured to rotationally drive the first sun gear (11).

13. A vehicle (1), the vehicle (1) comprising:

the drive unit (2) of claim 12; and drive wheels (70), the drive unit (2) being configured to rotationally drive the drive wheels (70).

* * * * *